(12) United States Patent
Khandelwal et al.

(10) Patent No.: US 9,997,944 B2
(45) Date of Patent: Jun. 12, 2018

(54) METHOD AND SYSTEM OF CHARGING A BATTERY

(71) Applicant: Samsung Electronics Co., Ltd., Suwon-si, Gyeonggi-do (KR)

(72) Inventors: Ashish Khandelwal, Bangalore (IN); Sanoop Ramachandran, Bangalore (IN); Krishnan Seethalakshmy Hariharan, Bangalore (IN); Ki-Young Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/790,420

(22) Filed: Jul. 2, 2015

(65) Prior Publication Data

US 2016/0006286 A1 Jan. 7, 2016

(30) Foreign Application Priority Data

Jul. 7, 2014 (IN) .......................... 3347/CHE/2014
Dec. 11, 2014 (IN) .......................... 3347/CHE/2014

(51) Int. Cl.
 *H02J 7/04* (2006.01)
 *H02J 7/00* (2006.01)

(52) U.S. Cl.
 CPC .................. *H02J 7/007* (2013.01)

(58) Field of Classification Search
 CPC ...................................... H02J 7/007
 USPC ....................................... 320/162
 See application file for complete search history.

(56) References Cited

U.S. PATENT DOCUMENTS

| | | | | |
|---|---|---|---|---|
| 5,493,199 A * | 2/1996 | Koenck | ................ | H02J 9/061 320/106 |
| 7,072,871 B1 * | 7/2006 | Tinnemeyer | ....... | G01R 31/3651 320/132 |
| 8,232,763 B1 * | 7/2012 | Boot | ................... | B60L 11/1816 320/104 |
| 8,560,153 B2 * | 10/2013 | Nefcy | ................... | B60K 6/445 180/65.265 |
| 8,823,324 B2 * | 9/2014 | Brandon, II | ......... | H02J 7/0003 320/107 |
| 9,170,304 B2 * | 10/2015 | Nukui | ................ | G01R 31/3648 |
| 2009/0132186 A1 * | 5/2009 | Esnard | ................. | G01R 31/361 702/63 |
| 2009/0273320 A1 * | 11/2009 | Ungar | ................. | H01M 4/5815 320/162 |
| 2012/0253536 A1 * | 10/2012 | Faley | ...................... | H02J 3/383 700/295 |
| 2013/0149583 A1 * | 6/2013 | Kurita | ................ | H01M 2/1077 429/120 |
| 2016/0190827 A1 * | 6/2016 | Ezawa | .............. | G01R 31/3679 320/107 |

* cited by examiner

*Primary Examiner* — M'Baye Diao
(74) *Attorney, Agent, or Firm* — Jefferson IP Law, LLP (57) ABSTRACT

Embodiments herein disclose a method and system of charging a battery. The method includes identifying a state of the battery and a plurality of current levels corresponding to the state of the battery. Furthermore, the method includes charging the battery by applying the plurality of current levels corresponding to a pre-defined sequence to attain a cut-off voltage of the battery.

19 Claims, 6 Drawing Sheets

METHOD AND SYSTEM OF CHARGING A BATTERY

CROSS-REFERENCE TO RELATED APPLICATION(S)

This application claims the benefit under 35 U.S.C. § 119(e) of an Indian Provisional application filed on Jul. 7, 2014 in the Indian Intellectual Property Office and assigned Serial number 3347/CHE/2014, and under 35 U.S.C. § 119(a) of an Indian patent application filed on Dec. 11, 2014 in the Indian Intellectual Property Office and assigned Serial number 3347/CHE/2014, the entire disclosure of each of which is hereby incorporated by reference.

FIELD OF INVENTION

Embodiments herein relates to a rechargeable battery, and more particularly to a method and system of charging a battery by dynamically modifying a charging profile of the battery.

BACKGROUND OF INVENTION

Generally, batteries are widely used as rechargeable energy storage devices for a variety of applications because of battery's relative high energy, power density and relatively low cost in comparison to other storage technologies. The batteries find applications in portable electronics, hybrid and electric vehicles, renewable power systems and others. A maximum charge level and a maximum charging rate for the battery is often predefined by a battery manufacturer and accordingly amplitude and duration of the charge being supplied to the battery is controlled. There are various charging methods for achieving high speed charging or long cycle life of the battery. Examples of the charging methods include a constant current-constant voltage (CC-CV) charging method, a boost charging method, a current attenuation charging method, a multistage CC-CV charging method, and a pulse charging method.

In existing systems, an electric charger may adaptively charge the battery using data which is representative of a partial relaxation time of the battery. Electric chargers are used for supplying a constant current and a constant voltage "CC-CV" to reach a full charge based on the battery manufacturer specifications. The CC-CV charging method uses a fixed charging profile where a constant current is applied until the certain cut-off voltage is reached in the battery and further the constant voltage is applied to reach the full charge capacity of the battery. The "CC/CV" charging process is also known as a static process. The static "CC/CV" charging profile is simple to implement in a battery management system. In other existing systems, a multi stage CC-CV profile is also used for fast charging the battery. Also, there are several aspects of considerations such as a pulse charging technique and a reflex charging technique which may be used for fast charging the battery.

The existing battery charging techniques are slow in nature; thereby, leading to a major customer dissatisfaction because a simple increase in the rate of charging will not lead to meet the maximum charge capacity of the battery along with thermal and life criteria standards. Thus, the existing battery charging techniques are not been completely optimized to achieve better performance of the battery.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method of charging a battery by dynamically modifying a charging profile of the battery.

Another object of the embodiments herein is to provide a method to identify a state of the battery and a plurality of current levels corresponding to the state of the battery.

Another object of the embodiments herein is to provide a method to charge the battery by applying the plurality of current levels in a pre-defined sequence to attain a cut-off voltage.

Embodiments herein disclose a method of charging a battery. The method includes identifying a state of the battery and a plurality of current levels corresponding to the state of the battery by an estimation unit. Further, the method includes charging the battery by applying the plurality of current levels corresponding to a pre-defined sequence to attain a cut-off voltage of the battery.

Embodiments herein disclose a apparatus for charging a battery. The apparatus includes an estimation unit configured to identify a state of the battery and a plurality of current levels corresponding to the state of the battery. Further, the apparatus includes a charge unit configured to charge the battery by applying the plurality of current levels corresponding to a pre-defined sequence to attain a cut-off voltage of the battery.

Embodiments herein provide a non-transitory computer-readable recording medium having a program recorded thereon, which when executed, performs a method of charging a battery, the method comprises identifying a state of a battery and a plurality of current levels corresponds to the state of the battery and charging the battery by applying the plurality of current levels corresponding to a pre-defined sequence to attain a cut-off voltage of the battery.

Embodiments herein disclose a method of charging a battery. The method includes identifying a state of the battery and a plurality of current levels corresponding to the state of the battery and charging the battery by applying the plurality of current levels corresponding to a charging profile created using the state of the battery to attain a cut-off voltage of the battery.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF THE PRESENT INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and apparatus for charging a battery. The method includes identifying a state of the battery and a plurality of current levels corresponding to the state of the battery. In an embodiment, the state of the battery can be state-of-health (SOH), state-of-charge (SOC), or chemical composition. Further, the method includes charging the battery by applying the plurality of current levels corresponding to a pre-defined sequence to attain a cut-off voltage. The pre-defined sequence refers to the process of applying each current level from the plurality of current levels to attain the cut-off voltage.

Unlike conventional systems, the proposed system and method can dynamically create the charging profile to fast-charge the battery based on the SOH, SOC, or chemical composition. Also, the charging time associated with the battery can be reduced by 70%. In an example, the commercial lithium ion battery can be charged in approximately 2500 seconds, this gives 70 percentage reduction in charging time as compared to the conventional charging algorithm (conventional charge time=7200 seconds). The proposed system does not require any hardware changes and can be easily implemented in a battery management system (BMS). The proposed fast battery charging method and system can be obtained using any type of battery model such as electrochemical, equivalent circuit; data based models, and the like.

Referring now to the drawings and more particularly to FIGS. 1 through 5, where similar reference characters denote corresponding features consistently throughout the figure, there are shown preferred embodiments.

Figure 1:
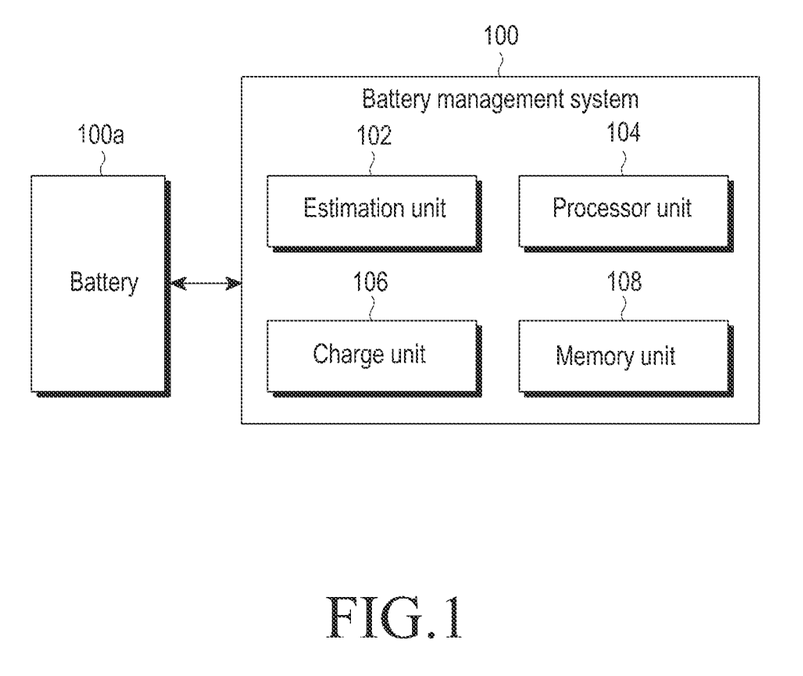
FIG. 1 illustrates a high level overview of a battery management system for charging a battery, according to the embodiments as disclosed herein.

FIG. 1 illustrates a high level overview of a battery management system 100 for charging a battery 100a, according to the embodiments as disclosed herein. The battery management system 100 includes an estimation unit 102, a processor unit 104, a charge unit 106, and a memory unit 108.

The estimation unit 102 can be configured to identify a state of the battery 100a and a plurality of current levels corresponding to the state of the battery 10. In an embodiment, the state of the battery 100a can be for example but not limited to a SOH, a SOC, and a chemical composition. Further, the estimation unit 102 can be configured to send the state of the battery 100a along with the plurality of current levels corresponding to the state of the battery 100a to the processor unit 104. On receiving the state of the battery 100a along with the plurality of current levels, the processor unit 104 can be configured to send the required current levels to the charge unit 106. The charge unit 106 can be configured to charge the battery 100a by applying the plurality of current levels corresponding to the pre-defined sequence with each current level applied till the predefined upper cut-off voltage is reached as detected by the estimation unit 102.

In an embodiment, the processor unit 104 can be configured to create an initial charging profile for the battery 100a based on the plurality of current levels and the time duration. Further, the processor unit 104 can be configured to identify an intersection current value between the initial charging profile and the SOC of the battery 100a. Further, the processor unit 104 can be configured to determine whether the SOC is equal to a SOC threshold. The charge unit 106 can be configured to charge the battery 100a by applying the plurality of current levels corresponding to the initial charging profile after determining that the SOC is equal to the SOC threshold.

The processor unit 104 can be configured to dynamically create a consecutive charging profile from the intersection current value in the initial charging profile after determining that the SOC is unequal to the SOC threshold. The charge unit 106 can be configured to charge the battery 100a by applying the plurality of current levels corresponding to the consecutive charging profile.

In another embodiment, the processor unit 104 can be configured to compute the difference between the SOC threshold and the SOC. Further, the processor unit 104 can be configured to determine whether the SOC is equal to the difference. The charge unit 106 can be configured to charge the battery 100a by applying the plurality of current levels corresponding to the initial charging profile after determining that the SOC is equal to the difference.

The processor unit 104 can be configured to dynamically create the consecutive charging profile from the intersection current value after determining that the SOC is unequal to the difference. The charge unit 106 can be configured to charge the battery 100a by applying the plurality of the current levels corresponding to the consecutive charging profile after determining that the SOC is unequal to the difference.

Further, the memory unit 108 stores the control instructions and operations which are used to perform various operations described herein.

In an embodiment, the method and system can create or modify the charging profiles based on the level of the battery 100a (i.e., SOC). In another embodiment, the method and system can adapt the charging profile based on a battery health status (i.e., SOH). In another embodiment, the method and system can adapt or select the charging profile based on a chemical composition.

In an embodiment, the processor unit 104 is configured to create or modify the charging profile of the battery 100a based on a received battery temperature measurement. The processor unit 104 is configured to utilize a battery 100a depth of discharge measurement to create or modify the charging profile of the battery 100a.

The FIG. 1 shows a limited overview of the battery management system 100 but, it is to be understood that other embodiment is not limited thereto. Further, the battery management system 100 can include any number of modules communicating among each other along with the other components of the battery management system 100.

Figure 2A:
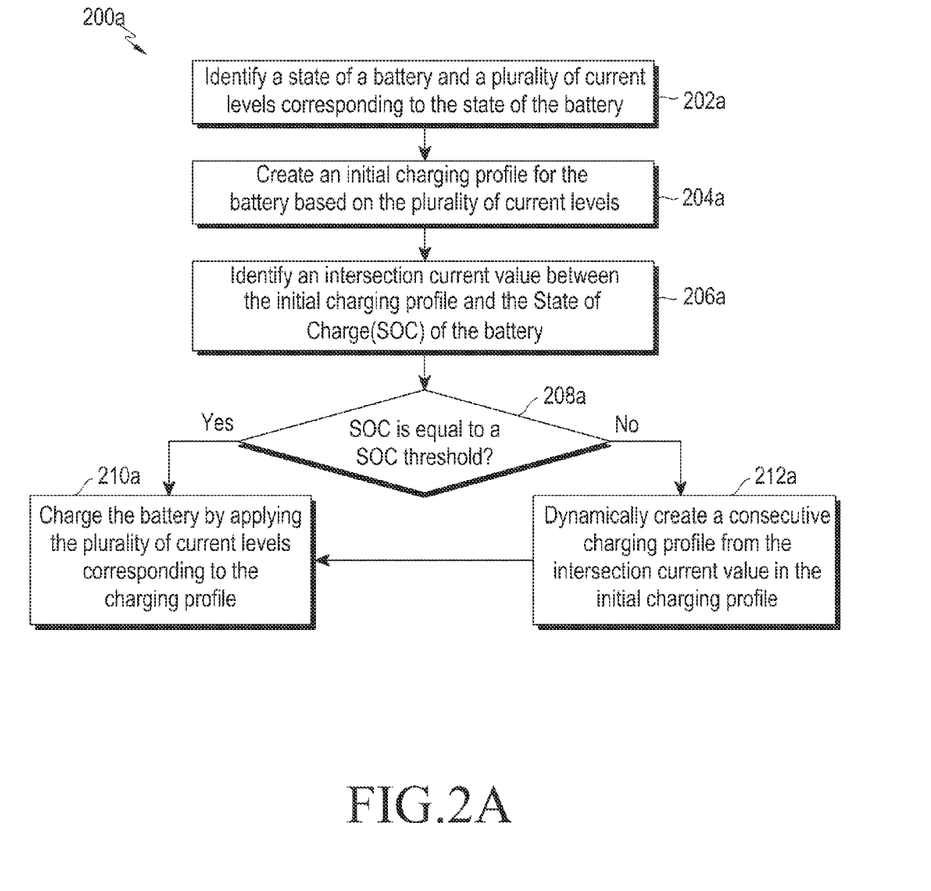
FIG. 2A is a flow diagram illustrating a method for charging the battery based on a State of Charge (SOC) by obtaining a fast charging profile, according to the embodiments as disclosed herein.

FIG. 2A is a flow diagram illustrating a method 200a for charging the battery based on the SOC by obtaining a fast charging profile, according to the embodiments as disclosed herein. At step 202a, the method 200a includes identifying the state of the battery and the plurality of current levels corresponding to the state of the battery. In an embodiment, the method 200a allows the estimation unit to identify the state of the battery and the plurality of current levels corresponding to the state of the battery.

At step 204a, the method 200a includes creating the initial charging profile for the battery based on the plurality of current levels. In an embodiment, the method 200a allows the processor unit 104 to create the initial charging profile for the battery based on the plurality of current levels. At step 206a, the method 200a includes identifying the intersection current value between the initial charging profile and the SOC of the battery. In an embodiment, the method 200a allows the processor unit 104 to identify the intersection current value between the charging profile and the SOC of the battery.

If it is determined, at step 208a, that the SOC is equal to the SOC threshold then, at step 210a, the method 200a includes charging the battery by applying the plurality of current levels corresponding to the initial charging profile. In an embodiment, the method 200a allows the charge unit 106 to charge the battery 100a by applying the plurality of current levels corresponding to the initial charging profile. If it is determined, at step 208a, whether the SOC is not equal to the SOC threshold then, at step 212a, the method 200a includes dynamically creating the consecutive charging profile from the intersection current value in the initial charging profile and charging the battery by applying the plurality of current levels corresponding to the consecutive charging profile. In an embodiment, the method 200a allows the processor unit 104 to dynamically create the consecutive charging profile from the intersection current value in the initial charging profile and charging the battery by applying the plurality of current levels corresponding to the consecutive charging profile.

The various actions, acts, blocks, steps, and the like in the method 200a may be performed in the order presented, in a different order or simultaneously. Further, in some embodiments, some actions, acts, blocks, steps, and the like may be omitted, added, modified, skipped, and the like without departing from the scope of the invention.

Figure 2B:
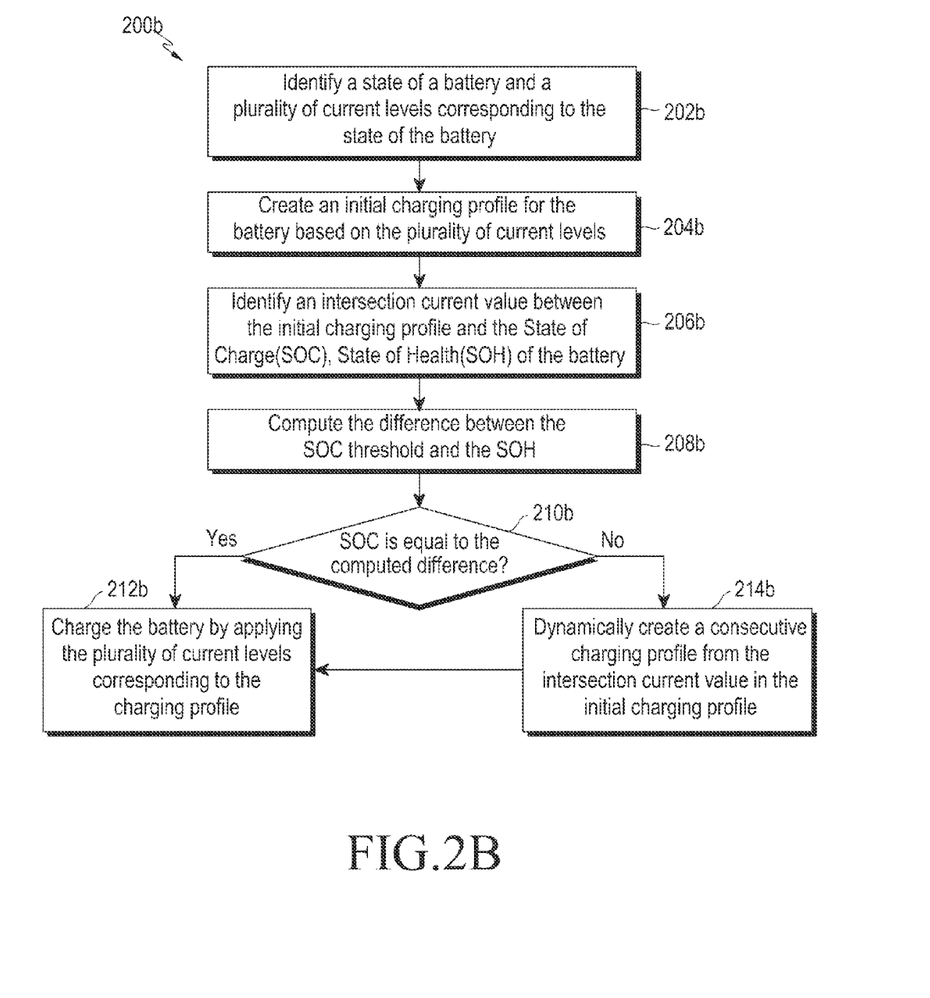
FIG. 2B is a flow diagram illustrating a method for charging the battery based on a SOC and State of Health (SOH) by obtaining a fast charging profile, according to the embodiments as disclosed herein.

FIG. 2B is a flow diagram illustrating a method 200b for charging the battery based on the SOC and SOH by obtaining a fast charging profile, according to the embodiments as disclosed herein. At step 202b, the method 200b includes identifying the state of the battery and the plurality of current levels corresponding to the state of the battery. In an embodiment, the method 200b allows the estimation unit 102 to identify the state of the battery and the plurality of current levels corresponding to the state of the battery.

At step 204b, the method 200b includes creating the initial charging profile for the battery based on the plurality of current levels. In an embodiment, the method 200b allows the processor unit 104 to create the initial charging profile for the battery based on the plurality of current levels. At step 206b, the method 200b includes identifying the intersection current value between the charging profile and the SOC, SOH of the battery. In an embodiment, the method 200b allows the processor unit 104 to identify the intersection current value between the charging profile and the SOC, SOH of the battery. At step 208b, the method 200b includes computing the difference between the SOC threshold and the SOH. In an embodiment, the method 200b allows the processor unit 104 to compute the difference between the SOC threshold and the SOH.

If it is determined, at step 210b, whether the SOC is equal to the computed difference then, at step 212b, the method 200b includes charging the battery by applying the plurality of current levels corresponding to the initial charging profile. In an embodiment, the method 200b allows the charge unit 106 to charge the battery by applying the plurality of current levels corresponding to the initial charging profile. If it is determined, at step 210b, whether the SOC is not equal to the computed difference then, at step 214b, the method 200b includes dynamically creating the consecutive charging profile from the intersection current value in the initial charging profile and charging the battery by applying the plurality of current levels corresponding to the consecutive charging profile. In an embodiment, the method 200b allows the processor unit 104 to dynamically create the consecutive charging profile from the intersection current value in the initial charging profile and charging the battery by applying the plurality of current levels corresponding to the consecutive charging profile.

In an embodiment, the consecutive charging profiles are varied based on a temperature of the battery 100a. Although the FIG. 2A and the FIG. 2B are explained by considering the state of the battery (i.e., SOC and the SOH), the above process can be applicable by considering the chemical composition of the battery 100a.

The various actions, acts, blocks, steps, and the like in the method 200b may be performed in the order presented, in a different order or simultaneously. Further, in some embodiments, some actions, acts, blocks, steps, and the like may be omitted, added, modified, skipped, and the like without departing from the scope of the invention.

Figure 3A:
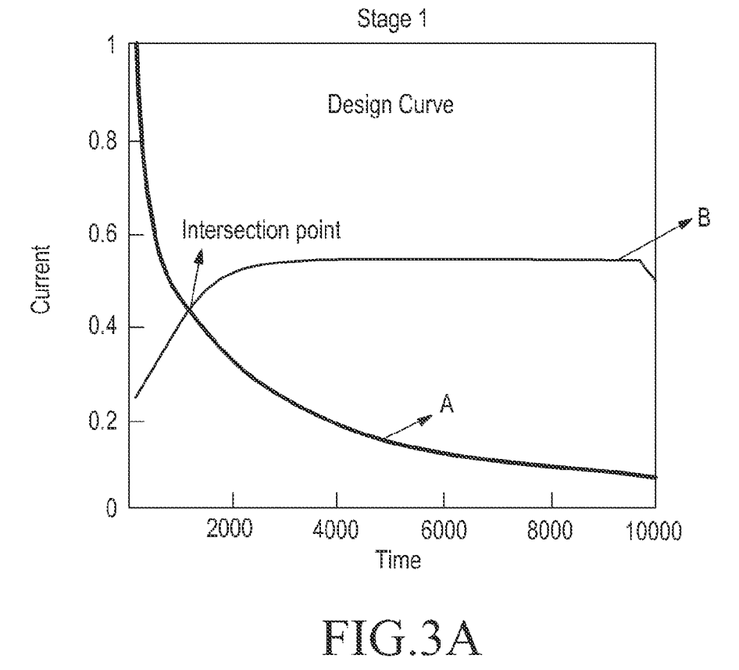
FIGS. 3A, 3B, and 3C illustrate graphs representing a design curve and determining a fast charging technique for the battery, according to the embodiments as disclosed herein.
Figure 3B:
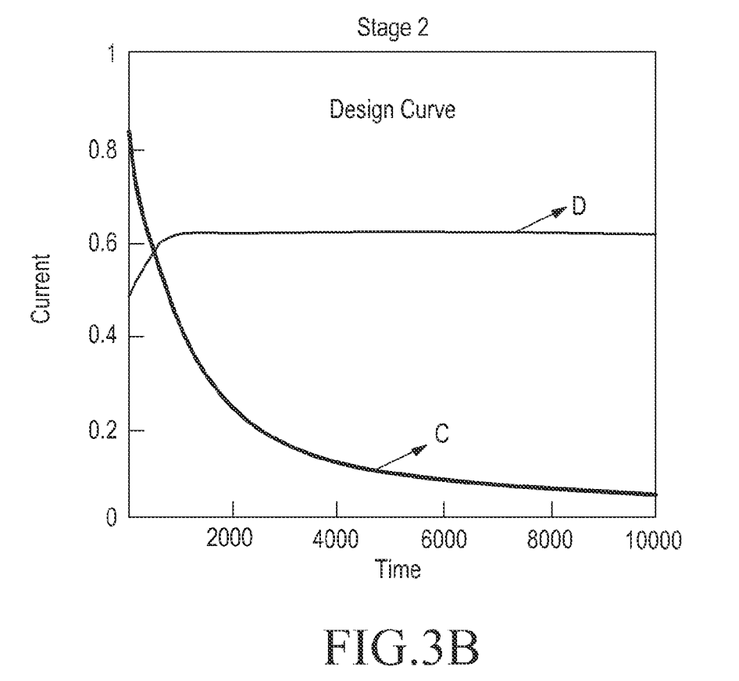
Figure 3C:
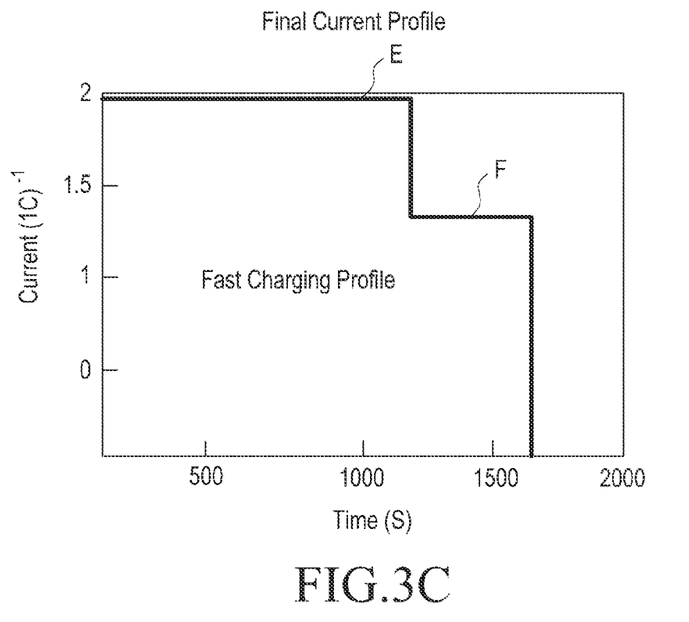

FIGS. 3A to 3C illustrate graphs representing a design curve and determining a fast charging technique for the battery, according to the embodiments as disclosed herein. As shown in the FIGS. 3A and 3B, a notation "A" refers to a waveform between current and time to reach a cut-off voltage level of 4.2V in case of lithium ion battery. A notation "B" refers to the normalized SOC evolution in a negative electrode of the battery 110a. The design curve is obtained for the multi-stage CC charging using the predefined profiles where the initial predefined profiles are calculated from an initial voltage of the battery 100a.

As shown in the FIG. 3A, the value of the current which is normalized with maximum current is varied from the high value to the low value (i.e. 1 CC to 0 CC) for the specific time durations required to achieve the upper cut-off voltage is noted and the value of current moves towards the right side thus, the value of current is reduced (i.e., denoted by the notation "A"). Also, the notation "B" represents the amount of charge stored in the battery 100a based on the electrochemical process thus, indicating the charge stored in the battery for the plurality of current values.

As shown in the FIG. 3B, the second design curve can be obtained based on whether the battery SOC has reached the target SOC (i.e., the SOC of the battery 100a after charging the battery 100a by applying the initial charging profile based on the stage 1 design curve as shown in the FIG. 3A). The value of the current which is normalized with maximum current is varied from the high value to the low value (i.e., 1 CC to 0 CC) with the time durations required to achieve the upper cut-off voltage noted and the value of current moves towards the right side thus, the value of the current is reduced (i.e., denoted by the notation "C"). A notation "D" represents the amount of charge stored in the battery 100a based on the electrochemical process; thereby, indicating the charge stored in the battery 100a for the plurality of current values.

As shown in the FIG. 3C, the graph depicts the normalizing the current based on the current value of 4.5 C and cut-off voltage of 4.2 volt. The two stage currents determined in the FIG. 3A and the FIG. 3B are applied consecutively with each stage current applied till the battery achieves the upper cut-off voltage of 4.2 V in case of lithium ion battery. The current value moves towards the right side is reduced with respect to the time. A first slope "E" is obtained from a first design curve model and a second slope "F" is obtained from a second design curve model.

Figure 4:
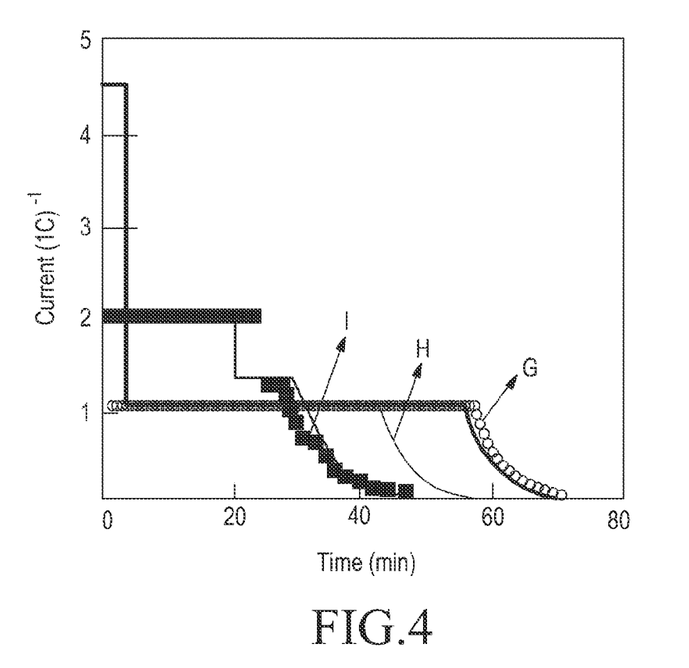
FIG. 4 illustrates a graph representing comparison of different charging techniques applied for the battery, according to the embodiments as disclosed herein.

FIG. 4 illustrates a graph representing comparison of different charging techniques applied for the battery, according to the embodiments as disclosed herein. The graph is obtained based on the battery specification (i.e., power: 120 Watt, configuration: 6s1p, capacity rating: 5200 mAh, and nominal voltage 24V). As shown in the FIG. 4, a notation "G" indicates that 72 minutes will take for charging the battery by using 1 C CC-CV charge profile. A notation "H" denotes that a non-optimized fast charging technique takes 55 minutes for charging the battery. A notation "I" denotes that optimized fast charging technique takes 42 minutes for charging the battery. The conventional charging takes 120 minutes for charging the battery (not shown in the FIG. 4). Also, the charging time associated with the battery can be reduced by 70%.

Figure 5:
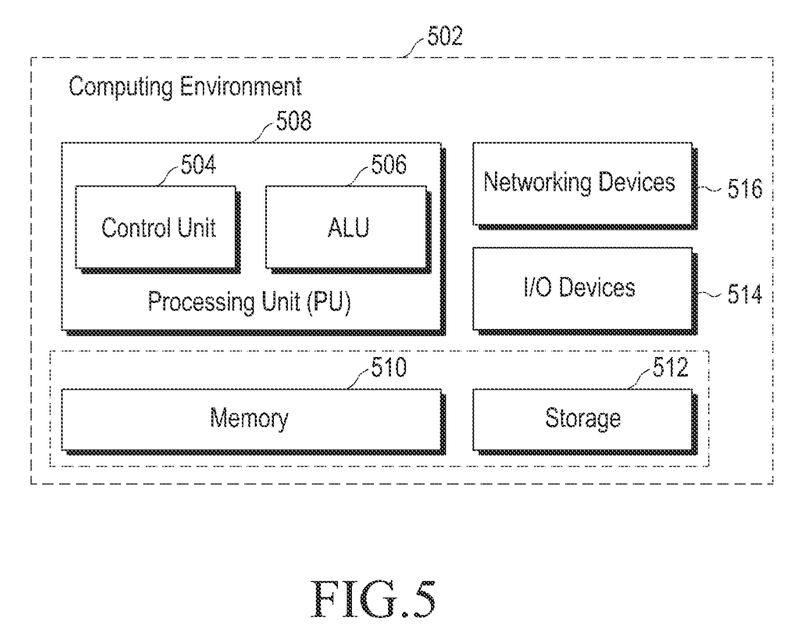
FIG. 5 illustrates a computing environment implementing a method and system of charging a battery, according to the embodiments as disclosed herein.

FIG. 5 illustrates a computing environment implementing a method and a system of charging a battery, according to the embodiments as disclosed herein. As depicted in the FIG. 5, the computing environment 502 comprises at least one processing unit 508 that is equipped with a control unit 504, an Arithmetic Logic Unit (ALU) 506, a memory 510, a storage unit 512, a plurality of networking devices 516 and a plurality Input output (I/O) devices 514. The processing unit 508 is responsible for processing the instructions of the algorithm. The processing unit 508 receives commands from the control unit in order to perform its processing. Further, any logical and arithmetic operations involved in the execution of the instructions are computed with the help of the ALU 506.

The overall computing environment 502 can be composed of multiple homogeneous and/or heterogeneous cores, multiple CPUs of different kinds, special media and other accelerators. The processing unit 508 is responsible for processing the instructions of the algorithm. Further, the plurality of processing units 508 may be located on a single chip or over multiple chips.

The algorithm comprising of instructions and codes required for the implementation are stored in either the memory unit 510 or the storage 512 or both. At the time of execution, the instructions may be fetched from the corresponding memory 510 and/or storage 512, and executed by the processing unit 508.

In case of any hardware implementations various networking devices 516 or external I/O devices 514 may be connected to the computing environment 502 to support the implementation through the networking unit and the I/O device unit.

The embodiments disclosed herein can be implemented through at least one software program running on at least one hardware device and performing network management functions to control the elements. The elements shown in the FIGS. 1 and 5 include blocks which can be at least one of a hardware device, or a combination of hardware device and software module The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of charging a battery in an electronic device, comprising:
   acquiring, by at least one processor of the electronic device, a state of the battery;
   determining, by the at least one processor, a first charging profile including a plurality of current levels in a time duration for charging the battery based on the state of the battery; and
   controlling to charge, by the at least one processor, the battery based on the first charging profile.

2. The method of claim 1, wherein the state of the battery comprises at least one of: a state of health (SOH), a state of charge (SOC), or a chemical composition.

3. The method of claim 1, wherein the determining of the first charging profile for charging the battery comprises:
   creating, by the at least one processor, the first charging profile for charging the battery based on the state of the battery; and
   identifying, by the at least one processor, a current value in the first charging profile corresponding to a SOC in the state of the battery,
   wherein the charging of the battery comprises charging the battery according to the current value in the first charging profile.

4. The method of claim 3, wherein the method further comprises:
   dynamically determining, by the at least one processor, a second charging profile including a plurality of current levels in a time duration for charging the battery, from the current value in the first charging profile, if it is determined not to use the first charging profile based on the SOC in the state of the battery; and
   controlling to charge, by the at least one processor, the battery according to the second charging profile.

5. The method of claim 1, wherein the determining of the first charging profile for charging the battery comprises:
creating, by the at least one processor, the first charging profile for the battery based on the state of the battery; and
identifying, by the at least one processor, a current value in the first charging profile corresponding to a SOC and a state of health (SOH) in the state of the battery,
wherein the charging of the battery comprises charging, by the at least one processor, the battery according to the current value in the first charging profile.

6. The method of claim 5, wherein the method further comprises:
dynamically determining, by the at least one processor, a second charging profile for charging the battery, from the current value in the first charging profile, if it is determined not to use the first charging profile based on the SOC and the SOH in the state of the battery; and
controlling to charge, by the at least one processor, the battery according to the second charging profile.

7. The method of claim 1, wherein the determining the first charging profile for charging the battery based on the state of the battery comprises:
determining, by the at least one processor, whether a SOC in the state of the battery is equal to a SOC threshold; and
determining, by the at least one processor, to use the first charging profile for charging the battery, if the SOC in the state of the battery is equal to the SOC threshold.

8. The method of claim 1, wherein the determining the first charging for charging the battery based on the state of the battery comprises:
computing, by the at least one processor, difference between a SOC threshold and a SOH in the state of the battery;
determining, by the at least one processor, whether a SOC in the state of the battery is equal to the computed difference; and
determining, by the at least one processor, to use the first charging profile for charging the battery, if the SOC in the state of the battery is equal to the computed difference.

9. An electronic device for charging a battery, the electronic device comprising:
a battery; and
at least one processor configured to:
acquire a state of the battery,
determine a first charging profile including a plurality of current levels in a time duration for charging the battery based on the state of the battery, and
control to charge the battery based on the first charging profile.

10. The electronic device of claim 9, wherein the state of the battery comprises at least one of a state of health (SOH), a state of charge (SOC), or a chemical decomposition.

11. The electronic device of claim 9, wherein the at least one processor is further configured to:
create the first charging profile for charging the battery based on the state of the battery, and
identify a current value bin the first charging profile corresponding to a SOC in the state of the battery.

12. The electronic device of claim 11, wherein the at least one processor is configured to charge the battery according to the current value in the first charging profile.

13. The electronic device of claim 11, wherein the at least one processor is further configured to:
dynamically determine a second charging profile including a plurality of current levels in a time duration for charging the batter, from the current value in the first charging profile, if it is determined not to use the first charging profile based on the SOC in the state of the battery, and
control to charge the battery according to the second charging profile.

14. The electronic device of claim 9, wherein the at least one processor is further configured to:
create the first charging profile for the battery based on the state of the battery, and
identify a current value in the first charging profile corresponding to a SOC and a state of health (SOH) in the state of the battery.

15. The electronic device of claim 14, wherein the at least one processor is further configured to charge the battery according to the current value in the first charging profile.

16. The electronic device of claim 14, wherein the at least one processor is further configured to:
dynamically determine a second charging profile for charging the battery, from the current value in the first charging profile, if it is determined not to use the first charging profile based on the SOC and the SOH in the state of the battery, and
control to charge the battery according to the second charging profile.

17. The electronic device of claim 9, wherein the at least one processor is further configured to:
determine whether a SOC in the state of the battery, is equal to a SOC threshold; and
determine to use the first charging profile for charging the battery, if the SOC in the state of the battery is equal to the SOC threshold.

18. The apparatus electronic device of claim 9, wherein the at least one processor is further configured to:
compute difference between a SOC threshold and a SOH in the state of the battery;
determine whether a SOC in the state of the battery is equal to the computed difference; and
determine to use the first charging profile for charging the battery, if the SOC in the state of the battery is equal to the computed difference.

19. A non-transitory computer-readable recording medium having a program recorded thereon, which when executed by at least one processor in an apparatus for charging a battery, performs a method of charging the battery, the method comprising:
acquiring a state of the battery;
determining a first charging profile including a plurality of current levels in a time duration for charging the battery based on the state of the battery; and
controlling to charge the battery based on the first charging profile.

* * * * *